United States Patent [19]

Fuertes et al.

[11] Patent Number: 5,300,150
[45] Date of Patent: Apr. 5, 1994

[54] PROCESS FOR THE IONIC EXCHANGE OF IONIZED STARCHES AND THE IONIZED STARCHES THUS OBTAINED

[75] Inventors: Patrick Fuertes, Lambersart; Jean-Louis Druex, Estaires, both of France

[73] Assignee: Roquette Freres, France

[21] Appl. No.: 727,956

[22] Filed: Jul. 10, 1991

[30] Foreign Application Priority Data

Jul. 10, 1990 [FR] France .................. 90 08767

[51] Int. Cl.⁵ .................. C13J 1/06; C08B 30/00; C08B 31/02
[52] U.S. Cl. .................. 127/70; 127/32; 127/46.2; 536/107; 536/109
[58] Field of Search .................. 127/46.2, 70, 32, 66, 127/67; 536/109, 107

[56] References Cited

U.S. PATENT DOCUMENTS

| 2,798,011 | 7/1957 | Fontein et al. ............ 127/66 |
| 3,422,087 | 1/1969 | Caesar .................. 536/50 |
| 3,666,751 | 5/1972 | Jarowenko et al. ............ 536/50 |
| 3,737,370 | 6/1973 | Jarowenko .................. 162/175 |
| 3,901,725 | 8/1975 | Bond et al. ............ 127/70 |
| 3,979,286 | 9/1976 | Wing et al. ............ 536/107 |
| 4,051,316 | 9/1977 | Wing et al. ............ 536/107 |
| 4,283,232 | 8/1981 | Best .................. 127/71 |
| 4,566,910 | 1/1986 | Hubbard et al. ............ 127/70 |
| 4,785,087 | 11/1988 | Stober et al. ............ 536/111 |
| 4,812,257 | 3/1987 | Stober et al. ............ 252/182.32 |

FOREIGN PATENT DOCUMENTS 51337 5/1982 European Pat. Off. .
277633 2/1988 European Pat. Off. .

*Primary Examiner*—R. Bruce Breneman
*Assistant Examiner*—Patricia L. Hailey
*Attorney, Agent, or Firm*—Larson & Taylor

[57] ABSTRACT

The invention has as its object a process for the ionic exchange of ionised starches, consisting of washing the ionised starch which is in the form of a granular solid by means of a solution containing one or more exchange ions capable of replacing the counter-ions present on the starch.

14 Claims, No Drawings

PROCESS FOR THE IONIC EXCHANGE OF IONIZED STARCHES AND THE IONIZED STARCHES THUS OBTAINED

The present invention has as its object a process for the ionic exchange of ionised starches. It also relates to the new ionised starches obtained by carrying out this process.

Starch is a polymer of anhydro-glucose units which may have various botanical origins: Wheat, maize, waxy maize, potatoes and others. In its naturally occurring state it has a granular, substantially crystalline structure and is insoluble in cold water.

Starch may, of course, be more or less ionised, depending on its origin. It is known, for example, that a starch from tubers, such as potato starch, contains anionic groups of the phosphate type. This anionic character may profitably be used in various applications of starch.

Further, the reaction of cationisation of starches is known by which cationic starches suitable in particular for the manufacture of paper may be obtained. Reference may be had, for example, to the book entitled "Starch Chemistry and Technology" by R. L. Whistler and E. F. Paschall, Chapter 16 (Academic Press, 1967). These starches are useful in particular for increasing the retention of the fibres and fillers and improving the drainage and physical characteristics of paper.

These starches are prepared by the reaction of the starch molecule with reactants carrying a cationic site and inducing the appearance of a positive charge. The chemical linkage involved may be of the ether or ester type but the ether linkage is generally preferred as it is more stable. Most cationic starches at present available commercially are prepared with reactants containing nitrogen of the tertiary amino or quaternary ammonium type.

Anionisation is also a known technique for grafting negatively charged substituents either on tuber starches which are by nature already more or less anionised or on non-ionised starches or on cationic starches to render them amphoteric. Such amphoterisation is said to reduce the sensitivity to pH.

The most commonly used anionic groups are of the phosphate or phosphonate type.

In these techniques of cationisation and/or anionisation, starch, generally in a granular form, is brought together, in most cases in an aqueous medium, with cationic or anionic reactants, as required, of which the associated ion or counter-ion (cation in the case of anionic reactants and anion in the case of cationic reactants) may sometimes give rise to problems when the ionised starch is put to use.

As example may be mentioned the case of cationic starches which are generally prepared by the etherification of starch by means of an tertiary amino or quaternary ammonium reactant whose associated ion or counter-ion is a halide, most frequently the chloride.

Now it is known that chloride ions have a particularly corrosive character which may prove harmful in certain applications such as the manufacture of paper as it may cause rapid deterioration of the apparatus.

In other applications, the corrosive effect of the counter-ion may also manifest itself in manufactured products brought into contact with or containing the ionic starches.

Apart from problems produced by certain counteranions or counter-cations in the application of ionised starches, it should be noted that these elements which serve to neutralize the charge of ionic substituents of the said starches are also liable to have a deleterious effect both in reactions for preparing the ionic reactants and in the subsequent reactions of etherification or esterification using these reactants. Certain associated anions or cations may, as a function of their chemical nature, exert forces of electrochemical attraction/repulsion capable of modifying the reactivity in the preparation of the reactant or the reactivity with starch during ionisation. This results in low production yields and hence a considerable economical cost for the preparation of ionised starches.

Numerous Patents deal with the preparation of ionised starches. Among these may be mentioned French Patent No.2,434,821 in the name of the Applicant, describing a process of cationisation of starch which consists of reacting granular starch with a tertiary amino, quaternary ammonium, quaternary phosphonium or tertiary sulphonium reactant. The reaction is carried out at a temperature of from 20° to 90° C. in the presence of an alkaline agent such as sodium hydroxide. The counterion is selected from chlorides, bromides and iodides. The said document discloses that the most suitable cationic reactant for cationisation appears to be the one associated with a chloride counter-ion. This is confirmed by the fact that the cationisation reactants available on the market are almost exclusively of this type (and the corresponding cationic starches).

Unfortunately, as indicated above, it is the chlorides which due to their corrosive character give rise to problems in certain applications of cationic starches.

U.S. Pat. No.3,422,087 describes a process for the preparation of cationic polysaccharide ethers. The cationic substituents chosen are of the tertiary amino alkylene or quaternary ammonium type. According to this process, the reaction is carried out on a granular starch in the solid state in a liquid reaction medium in a quantity just sufficient to be completely absorbed by the starch granules and in the absence of a strong base. The cationic etherifying agents are linked to numerous inorganic or organic counter-ions, a non-limiting list of which is given in the Patent. If one considers the position at the effective date of this document (1962), one may decide that the definition of counter-ions is too wide. At that time, it was not possible to prepare cationic substituents with counter-ions of just any nature. This is particularly the case with phosphates or certain organic carbanions of the carboxylic type. The Patent contains no information enabling the man of the art to produce such reactants. It should also be noted that the only counter-ions associated with cationic substituents used in the examples are p-tosylate and chloride.

It should also be considered that the reaction of ionisation and in particular of cationisation of starch provides no equivalent efficiency or reaction yield, no matter what ionisation reactant is used.

It appears, therefore, that it is not easy to prepare ionised starches containing counter-charges of any chemical nature.

It has, however, been one of the preoccupations of the man of the art to resolve this problem of the presence of undesirable ions such as chloride ions in cationisation reactants and in cationic starches and to enable ionic starches containing the chosen associated ions to be prepared easily and with high yields. Thus it has been proposed in EP Patent Application No.0 51 337 to convert cationisation reactants of the type of halides of glycidyl trimethylammonium (G.T.A.) into reactants of the type of sulphates of glycidyl trimethylammonium with the aid of an ion exchange resin. It has been found that the reactivity of these sulphates of GTA in cationisation was not as good as that of the chlorides of GTA. Moreover, one is limited here to a very particular counter-ion since the conversion by ion exchange is not applicable to all anions.

Further, this technique requires the use of an epoxide type of reactant. Now it is known that epoxide reactants are very troublesome, unstable and corrosive and thus difficult to handle. As in all techniques acting more specifically on the cationisation reactant, the solution priorly disclosed in this EP Patent Application No. 0 51 337 would not appear to be satisfactory.

It is one of the objects of the present invention to overcome the disadvantages of the techniques of the prior art.

After numerous studies and researches, the Applicant Company has found that it is possible to prepare starches substituted with electrically charged groups and having particular and previously selected associated counter-ions by washing the ionised starch in the form of a granular solid with a solution containing exchange ions so that the counter-ions present on the starch will be replaced in whole or in part by the said exchange ions.

The process of ionic exchange of ionised starch, that is to say of starch carrying ionic substituents associated with counter-ions according to the invention is thus characterised in that it consists of washing the ionised starch in the form of a granular solid with a solution containing one or more exchange ions capable of partly or completely replacing the counter-ions of the starch.

It was completely surprising and unexpected to find that the ionic exchange by washing according to the invention would take place extremely efficiently and rapidly. Bearing in mind the granular and compact structure of starch, it was not possible to foresee that the solution containing the exchange ions would pass so easily and rapidly through the ionised starch and above all that the said ions would exchange with the counter-ions on the starch with such a high yield. It has in fact been found that this yield was generally above 80% or even 90%.

By means of the process of ion exchange according to the invention, a new ionised starch whose counter-ions can be previously chosen according to the final application envisaged can be prepared from any ionised starch containing given counter-ions.

As already envisaged above, it may be advantageous to provide exchange ions of various chemical types for the washing solution.

By virtue of its high speed and high ion exchange yield, this process perfectly satisfies the industrial demands for economy and profitability.

The quality of the starches obtainable by the process is entirely comparable to that of starches which can be produced by the conventional processes of cationisation or anionisation.

At the end of the ion exchange, the washing solution containing the counter-charges initially attached to the starch on the one hand and the exchanged ionised starch on the other hand are recovered and the latter may be filtered and dried.

The ionised starches used for the present invention may be of any origin. They may be cereal starches (maize, waxy maize, wheat, etc.) and/or tuber starches (potato starch, cassava, etc.).

The ionic character of the ionised starch subjected to the exchange may be simply that occurring in the natural state of the starch. This is particularly the case with potato starch which contains ionic groups of the phosphate type. This ionic character may, however, equally be obtained by a treatment of cationisation or anionisation of known type consisting of grafting electrically charged substituents on the hydroxyl groups of starch by means of an ether or ester linkage. Reference may be made in this connection to, for example, the cationisation of starch described in French Patent No. 2 434 821 in the name of the Applicant. It goes without saying, however, that this does not constitute a limitation to the present invention since any starch having an ionic character would be perfectly suitable.

The washing solution used in the process according to the invention preferably consists at least partly of water. This is, of course, water depleted of ions different in nature from the exchange ions chosen and used for the process according to the invention. One or more non-aqueous solvents selected, for example, from alcohols or ketones may be added to the water.

The use of one or more cosolvents may be useful if the ionised starch to be exchanged is highly substituted and therefore has a tendency to solubilise in cold water.

The exchange ions of the washing solution are organic and/or inorganic cations and/or anions of any nature and as regards the anions they may be chosen from the following non-limiting list: Halide, nitrate, nitrite, sulphate, sulphite, thiosulphate, acetate, adipate, citrate, gluconate, formate, p-tosylate, propionate, phosphate, borate, thiocyanate, sulphamate and others; as regards the cations, they may be chosen from the following non-limiting list: Sodium, potassium, magnesium, calcium, barium, manganese, iron, nickel, lead and others.

The quantity of exchange ions in the washing solution depends directly on the quantity of countercharges or counter-ions which one wishes to substitute. For obtaining a substitution of counter-charges greater than or equal to 70% (exchange yield), preferably substantially complete substitution of counter-charges, it is suitable to provide a stoichiometric ratio of exchange ions/-countercharges greater than or equal to 1:1, more preferably from 1.1:1 to 1.3:1.

This ratio will, of course, be adjusted downwards with respect to the exchange ions if only partial substitution is to be effected. The speed of exchange depends in particular on the quantity of washing solution employed in relation to the quantity of starch to be exchanged and on the number of washing operations.

The exchange process is advantageously carried out with a washing solution at a temperature below 60° C. It is preferably substantially at room temperature.

According to a first embodiment of the process of the invention, the exchange is effected by means of at least one washing consisting of bringing the washing solution into contact with the ionised starch and then subjecting this mixture to a separation by density gradient so as to recover on the one hand the washing solution enriched with extracted countercharges and on the other hand the granular ionised starch associated with the exchange ions.

In one variation of this first embodiment of the process, the washing operation is carried out with the aid of at least one conical hydrocyclone. The washing solution and ionised starch are injected under pressure into the interior of the hydrocyclone, where they are subjected to a swirling movement which brings about contact and a separation into an over-flow containing the countercharges and an under-flow consisting of the at least partially exchanged starch.

A cascade of several hydrocyclones arranged in series and equipped with a system for the circulation of washing solution in countercurrent may advantageously be provided, this circulation being arranged so that the washing solution is introduced into the last hydrocyclone of the cascade while the starch to be exchanged is introduced into the hydrocyclone at the head of the series. The over-flow from each hydrocyclone is capable of supplying at least one of the preceding hydrocyclones of the series.

The hydrocyclone apparatus which may be used for carrying out the process according to the invention are well known in the field of chemical engineering for the industrial manufacture of starch. Their adaptation to the process of exchange presents no difficulty to the man of the art.

Explanations on the structure and function of a hydrocyclone are to be found on pages 5 and 120 to 129 of the work entitled "Starch Production Technology" by J. A. Radley, "Applied Science Publishers Ltd" 1976. A simplified diagram of a cascade of hydrocyclones with circulation of wash water in counter-current is shown in FIGS. 7–4 of page 120 of the said work.

The work "Starch : Chemistry and Technology" by R. L. Whistler & E. F. Paschall, volume II, "Academic Press" also shows on pages 42–44 the principle of operation of a hydrocyclone and of a cascade of hydrocyclones.

According to another variation of this first embodiment, the washing operation is carried out with the aid of at least one centrifugal or decanting apparatus suitable for mixing the washing solution with the ionised starch, exchanging and separating a solution enriched with extracted counter-ions, constituting the overflow, from starch which has been at least partially exchanged, which constitutes the underflow.

It is clear that, as above, a plurality of centrifugal or decanting separating devices may be arranged in series for carrying out the washing operation, optionally with circulation of the washing solution in counter-current.

A plate type centrifuge device known per se of the type marketed by Socidtd Merco is perfectly suitable for carrying out the process. The publication "Starch Production and Technology" mentioned above shows, on page 129, a diagrammatic partial section explaining the principle of operation of such a centrifuge device.

According to a second embodiment of the process of the invention, the washing solution is passed through a mass of ionised starch.

This migration or percolation of the washing solution may be achieved by various means.

A first means consists of employing a rotary drum filter under vacuum. This device comprises a hollow cylindrical drum rotatable about its axis and arranged inside a vat designed to contain a suspension or slurry of ionised starch which is to be exchanged. The wall of the drum functions as a filter for retaining the starch. Means for spraying the washing solution are also provided, arranged so that the said solution can be projected against the part of the wall of the drum which is not immersed and situated opposite the opening of the vat. When the drum is in operation, its interior is put under a vacuum so that after it has been set into rotation, a fine layer or "cake" of starch is deposited over the whole surface of the filtration wall of the drum. The washing solution is projected over the "cake" when it circulates through the non-immersed zone of the drum. The liquid fraction is sucked by the vacuum into the interior of the drum to be carried to the outside by discharge means.

After having passed through the whole non-immersed zone and been subjected to spraying, the washed and exchanged starch cake is collected with a scraping knife arranged in contact with the drum along one of its generatrices.

The thickness of the layer of starch may, of course, be varied by adjusting the vacuum, the output of the spraying means and the speed of rotation of the drum.

All these adjustments are within the scope of the man of the art. They enable him to optimize the exchange process.

Another means of carrying out the percolation of the washing solution through the starch which is to be exchanged consists of using a centrifugal drying drum or tumbler drier. This well-known type of apparatus is capable of forming a cake of starch on its internal walls by centrifugation of a slurry of starch. All that is necessary is to provide means of spraying the washing solution at the level of the axis of the said drum so as to enable the cake to be impregnated by the washing solution and enable the latter to travel through the said cake and then be discharged into the vat containing the drying drum in the same manner as the liquid phase of the starch slurry.

A perfectly exchanged ionised starch is obtained at the end of the drying process.

According to one advantageous arrangement of the invention, the ionised starch put into the process is a cationic starch obtained by the reaction in an alkaline medium of a granular starch with a cationic reactant having a halide as its counter-anion.

In view of the well-known and confirmed efficiency of cationic reactants based on chlorides, as evidenced also also by the fact that they are virtually the only cationic reactants available on the market, the counter-ion chosen is advantageously a chloride.

The cationic reactant used is preferably a reactant such as the chloride of 3-chloro-2-hydroxypropyl-trimethylammonium of the type marketed by Degussa under the name of QUAB 188.

In addition to all the ionised starches obtained directly by the process of exchange described above, the present invention provides, by way of novel industrial products as such, cationic starches whose counter-anions consist at least in part of ions of the phosphate and/or carboxylate type.

In the context of the present invention, the term "phosphate" denotes any anion derived from phosphoric acid, for example in the meta, pyro, ortho, tripoly or trimeta form and others, preferably in the ortho or poly form. The following anions are examples: $PO_4^{3-}$, $PO_4X^{2-}$, $PO_4XX'^{3-}$ and $PO_4Y^-$, where X and X' are monovalent cations (in particular $Na+$ or $K+$) and Y denotes a divalent cation (in particular $Ca^{2+}$ or $Mg^{2+}$).

The carboxylate ion may be selected from the following non-limiting list: adipate, citrate, gluconate . . .

It has never hitherto been possible to produce cationic starches with phosphate and/or carboxylate counter anions owing to the impossibility of preparing cationisation reactants containing these counter charges and/or bringing about the cationisation.

The ionised starches according to the invention may in particular be used in the paper industry, in the textile industry or in the cosmetics industry.

The invention will be better understood with the aid of the following examples of practical application of the ionic exchange and of application of the products obtained, given by way of supplementary information and therefore not limiting.

EXAMPLE I

Ionic exchange by exchange ions of the phosphate type of a cationic starch by the process according to the invention.

a) Cationisation of the starch

A potato starch slurry obtained by the dispersion of 1000 kg of starch having a dry substance content of 80% in 1200 litres of water is introduced into a 4 m$^3$ reactor equipped with stirrer. 105 kg of a solution having a dry substance content of 50% of 3-chloro-2-hydroxypropyltrimethylammonium chloride marketed by Degussa under the name of QUAB 188 are then added, followed by 560 litres of a caustic soda solution diluted to 40 g/l.

The reaction is carried out at a temperature maintained at 38° C. for about 15 hours.

Neutralisation is then carried out with phosphoric acid to adjust the pH of the reaction medium to 7.0-8.0.

The total volume obtained of the slurry of cationic starch having a dry substance content of 33% is 2.3 m$^3$.

Analyses are carried out on a sample to determine the nitrogen content fixed to the starch (Kjeldahl method). This is found to be 0.37% by weight measured on the dry product, which amounts to $2.57 \times 10^{-2}$ M per 100 g.

The total quantity of chlorides present in the slurry of cationic starch obtained reaches 2.4% by weight expressed as dry content. A fraction of these chlorides may be removed by simply washing with water.

On the other hand, the fraction of chlorides associated with the quaternary nitrogen in an equimolar quantity and corresponding to 0.94% by weight, based on the dry substance of starch, amounting to $2.57 \times 10^{-2}$ mol per 100 g, cannot be removed by such an operation.

b) Ionic exchange according to the invention 5.3 m$^3$ of a 0.7% solution of disodium phosphate is first prepared for carrying out ion exchange between these chlorides and phosphate ions.

The total quantity of phosphates employed is 37 kg, corresponding to a molar stoichiometric ratio of phosphates/chlorides of 1.2:1.

The excess of exchange agents is thus only 20%.

In the process according to the invention, the slurry of cationic starch is washed in countercurrent with this dilute disodium phosphate washing solution in a cascade of 7 stages of hydrocyclones, each stage comprising a plurality of conical hydrocyclones.

A slurry of cationic starch exchanged by phosphate counter-anions and the washing solution charged with chlorides are thus obtained at the outlet end of this cascade.

The slurry of exchanged cationic starch is then subjected to filtration and drying for obtaining the starch in a pulverulent form in which it can be conditioned.

Analysis of the end product shows a very small residue of chlorides, of the order of 0.06% by weight of dry substance. The yield of ionic exchange is particularly high, amounting to $(0.94-0.06) \times 100/0.94 = 94\%$, which means that 94% of the chlorides initially attached to the starch have been replaced by phosphates.

It should be noted that in addition to these quite remarkable performances, the process according to the invention has a very appreciable simplicity and speed of operation. The hydrocyclone cascade used is an inexpensive apparatus conventionally used in starch production and enables the exchange to be carried out within only a few hours (from 4 to 5 hours in the present example).

Given that the useful volume of each hydrocyclone stage employed in the present example is of the order of 1.5 litres and taking into account the rate of flow of fluids, the mean residence time in one hydrocyclone stage is only 2 to 3 seconds.

EXAMPLE II

Test for the removal of chlorides present in a cationic starch identical to that obtained in Example I.a without employing the process according to the invention.

The cationic starch with chloride counter-ions used is that obtained in Example I.a by reaction of the starch with QUAB 188.

It contains 2.4% by dry weight of chlorides, of which 0.94% by dry weight is associated with an equimolar quantity of quaternary nitrogen.

The slurry of cationic starch is washed with water (with reduced ion content) in the same cascade of hydrocyclones as that of Example I.b.

After filtration and drying of the cationic starch slurry obtained, the residual chloride content is found to be of the order of 0.90% by dry weight.

This result demonstrates that the chloride ions associated ionically with nitrogen cannot be eliminated by simple washing with water.

EXAMPLE III

Ionic exchange of a cationic starch of waxy maize origin by exchange ions of the phosphate type by the process according to the invention.

a) Cationisation

A slurry of waxy maize starch obtained by dispersing 1000 kg of waxy starch having a dry substance content of 87% in 1300 litres of water is introduced into a 4 m$^3$ reactor equipped with stirrer. 100 kg of a solution having a 50% dry substance content of 3-chloro-2-hydroxypropyltrimethylammonium chloride marketed by Degussa under the name of QUAB 188 are then added, followed by 600 litres of a caustic soda solution diluted to 40 g/l.

The reaction is carried out at a temperature maintained at 38° C. for about 15 hours.

The reaction medium is then neutralised with phosphoric acid to adjust the pH to 7.0-8.0.

The total volume obtained of starch slurry having a dry substance content of 33% is 2.3 m$^3$.

Analyses are carried out on a sample to determine the level of nitrogen fixed to the starch (Kjeldahl method). This is found to be 0.32% by weight measured as dry product, amounting to $2.29 \times 10^{-2}$ M per 100 g.

The total quantity of chlorides present in the starch slurry obtained is 2.2% by weight, expressed as dry content. A fraction of these chlorides may be eliminated by simple washing with water.

On the other hand, the fraction of chlorides associated with the quaternary nitrogen in an equimolar quantity, corresponding to 0.91% by dry weight and amounting to $2.29 \times 10^{-2}$ mol per 100 g, cannot be eliminated by such an operation.

b) Ionic exchange according to the invention 5.8 m³ of washing solution consisting of a 0.6% by weight aqueous solution of disodium phosphate are first prepared. This is equivalent to a total quantity of phosphate of 35 kg, amounting to a molar ratio of phosphates to chlorides associated with nitrogen alone of 1.1:1.

The slurry of cationic waxy starch is then washed in counter-current with this aqueous solution of phosphate in a cascade of hydrocyclones in the same manner as in Example I.b.

The slurry of exchanged cationic waxy starch is filtered and the filter residue is then dried.

The chloride content of this cationic starch is no more than 0.05% by dry weight, corresponding to an ion exchange yield of $(0.91-0.05) \times 100/0.91 = 95\%$. Only 5% of the initial chlorides are still present.

The details of operation employed in this example III and in example I obviously constitute a balance between the efficiency of ion exchange and economical profitability, a balance which is a necessary condition for industrial exploitation, but to optimize the process in a pilot plan, increasing the number of washing stages would be sufficient for obtaining a yield close to 100%.

EXAMPLE IV

Ionic exchange of a cationic starch containing chloride counter-anions by exchange ions of the sulphate type by the process according to the invention a) Cationisation The cationic starch is prepared in the same manner as described in example I.a except that the starch slurry is neutralised to a pH of 5.0–7.0 with sulphuric acid.

2.6 m³ of cationic starch slurry with chloride counter-anions having a dry matter content of 33% are thus obtained.

These chloride counter-ions amount to 0.94% by dry weight of the starch.

b) Ionic exchange according to the invention

The washing solution employed is an aqueous solution of 0.7% by weight of sodium sulphate. 5.3 m³ of the solution are prepared, which is equivalent to 37 kg of sulphate.

The molar ratio of sulphates/chlorides (counteranions) is 1.2:1, amounting to a 20% excess of sulphate.

After washing in a cascade of hydrocyclones, filtration and drying according to the particulars given in example I.b, a cationic starch exchanged by sulphate ions is obtained, in which the chloride content is 0.08% by weight. The yield of ion exchange is thus $(0.94-0.08) \times 100/0.94 = 92\%$.

EXAMPLE V

Ionic exchanges by percolation of a cationic starch containing chloride counter-anions by exchange ions of the phosphate type by the process according to the invention 1) Test A The starting material used is an ionised starch marketed by the Applicant under the Trade Mark HI-CAT 142. It consists of a cationic starch containing 3.78% by weight, expressed as dry content, of the group 3-oxy-2-hydroxy-propyl-trimethylammonium in the form of the chloride:

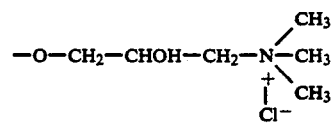

which amounts to 0.89% by dry weight of chloride ions attached to ammonia.

500 g of HI-CAT 142 having a dry substance content of 83% are dispersed with stirring in 610 g of water, which is equivalent to 0.104 mol of $Cl^-$ attached to ammonium. The starch slurry obtained is dried under vacuum on a fritted glass Büchner funnel or filter having a porosity of 2 and a diameter of 132 mm. This Büchner filter forms an integral part of a cylindrical funnel having a tubular extension fitted over an Erlenmeyer flask to receive the filtrate and equipped in its upper part with a tubular connection for putting the apparatus under a vacuum.

A cake 6 cm in thickness, corresponding to a volume of 820 cm³, is obtained after drying.

2200 g of a washing solution containing 0.7% of disodium phosphate ($Na_2HPO_4$), amounting to 15.4 g of the anhydrous form or 0.108 mol are rapidly percolated through the cake by applying a vacuum of 0.9 bar (molar stoichiometric phosphate/chloride ratio 1.04:1). The total time taken for the passage of 2200 g of washing solution is 14 minutes, which corresponds to a flow of washing solution equal to 11.5 volumes of cake per hour. When the cake has been well drained it is dried in a fluidized bed to a water content of 17.6% by weight. Its residual chloride content is less than 0.001% by dry weight, which amounts to an optimized exchange yield greater than $(0.89-0.001) \times 100/0.89 = 99.9\%$.

This test demonstrates the efficiency of the exchange process according to the invention which enables all the counter-anions to be replaced, no matter what their nature, by different anions such as phosphates, sulphates or carbanions of organic acids.

It is also of interest to note the speed with which this process can be carried out. In the present test, the rate of passage through the cake is in fact of the order of 69 cm per hour.

2) Tests B, C, D

These tests are carried out under the same conditions as those defined above for test A except as regards the quantity of washing solution containing the phosphates and, in the case of test D, the quantity of phosphates employed.

The data and results of these tests B, C and D are shown in table 1 below:

TABLE 1

| | B | C | D |
|---|---|---|---|
| Quantity of $Cl^-$ attached to quaternary ammonium (in % by dry weight) | 0.89 | 0.89 | 0.89 |
| Quantity of washing solution ($Na_2HPO_4$) employed for 500 g | 550 | 154 | 550 |

TABLE 1-continued

| | B | C | D |
|---|---|---|---|
| of starch having a dry matter content of 83% to be percolated (in g) | | | |
| Concentration of Na$_2$HPO$_4$ in the washing solution (in % by weight) | 2.8 | 10 | 1.4 |
| Molar stoichiometric ratio of phosphates/chlorides for the exchange | 1.04:1 | 1.04:1 | 0.52:1 |
| Time of passage of the solution through the Büchner funnel (in seconds) | 150 | 35 | 110 |
| Exchange yield (in %) | 99.9 | 88.4 | 84 |

In test D, partial replacement of the chlorides by phosphates is carried out since the stoichiometric phosphate/chloride ratio is only 0.52:1.

The exchange yield is then 84%.

For a given stoichiometric ratio (tests B and C), the quantity of washing solution for percolation is varied. It is found that when the quantity of solution is reduced from 550 g to 154 g, the time of percolation is reduced from 150 seconds to 35 seconds but the exchange yield is at also reduced, from 99.9% to 88.4%.

EXAMPLE VI

Ionic exchanges by percolation of a cationic starch containing tertiary amino substituent associated with a chloride by exchange of ions of the phosphate type.

The starting material used is a cationic starch marketed by the Applicant Company under the name of HI-CAT DEC. It is a cationic starch substititued with 3-oxy-2-hydroxy-propyl diethylamine groups in the form of the chloride:

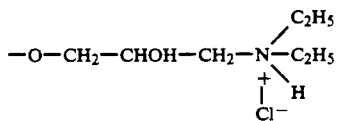

It contains 1.03% by dry weight of chloride ions attached to the tertiary amine.

Two tests E and F are carried out in accordance with the operating details of Example V.

The data and results of these tests are indicated in table 2 below.

TABLE 2

| | Test E | Test F |
|---|---|---|
| Quantity of Cl$^-$ attached to the tertiary amine (in % by dry weight) | 1.03 | 1.03 |
| Concentration of disodium phosphate (HNa$_2$PO$_4$) in the washing solution (in % by weight) | 0.7 | 0.6 |
| Molar stoichiometric ratio of phosphates/chlorides for exchange | 1.08:1 | 0.925:1 |
| Time of passage of the washing solution through the Büchner funnel with broken vacuum (in min.) | 41 | 43 |
| Exchange yield (in %) | 97.8 | 87.2 |

The results of tests E and F show that the exchange according to the invention operates equally well on a cationic starch containing tertiary amino substituent.

It is found that using a partial vacuum below that of example V (=0.9 bar) has virtually no effect on the efficiency of exchange; only the duration is slightly longer; about 40 minutes as against 14 minutes.

In test F, only partial exchange is carried out since the phosphate/chloride ratio is only 0.925:1. The exchange yield is thus of the order of 87%.

EXAMPLE VII

Ionic exchanges by percolation of a cationic starch containing chloride counter-anions by organic (carboxylates) and inorganic (sulphites) exchange ions In this example, percolation is carried out in four tests G, H, I and J by the same method as in example V except that the 2200 g of washing solution contain 0.11 M of:

sodium adipate for test G
sodium citrate for test H
sodium gluconate for test I
sodium sulphite for test J.

In tests G and H, the cake of exchanged HI-CAT 142 starch obtained after percolation of the washing solution is neutralised to pH 7 with a sodium hydroxide solution.

As in example V, the cationic HI-CAT 142 starch to be exchanged contains 0.89% by dry weight of chlorides attached to ammonia, amounting to 0.104 M in the 500 g treated.

The molar stoichiometric ratios of counteranions/chlorides in tests G to J are thus in all cases 1.06:1.

The results are shown in Table 3 below.

TABLE 3

| | G | H | I | J |
|---|---|---|---|---|
| Time of passage of the washing solution through the Büchner funnel (in min) | 13 | 18 | 14 | 14 |
| Exchange yield in % | 99.9 | 99.9 | 86.1 | 99.9 |

The high exchange yields obtained in these tests G to J clearly show the efficiency of the process according to the invention both for organic counter-ions such as carboxylates and for inorganic counter-ions such as sulphites.

EXAMPLE VIII

Ionic exchange by percolation of an anionic starch having sodium counter-ions by exchange ions of the potassium type by the process according to the invention.

The starting material used is an anionic starch with carboxymethyl substituent in the sodium form:

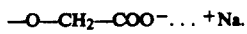

This anionic starch is of the type described in "Modified Starches Properties and uses" by O. B. Wurzburg-CRC Press, pages 187-188.

It contains about 1.5% by dry weight of carboxymethyl substituent, corresponding to 0.42% by dry weight of sodium ions.

The ionic exchange is carried out in accordance with the operating method given in Example V, test A.

The washing solution in this case consists of 1144 g of an aqueous 0.5% solution of potassium chloride (KCl), corresponding to 5.72 g of the anhydrous form or 0.0767 mol for 0.073 mol of sodium ion Na$^+$ in 500 g of anionic starch having a dry substance content of 20%.

The molar stoichiometric ratio of potassium/sodium is therefore 1.05:1.

A residual sodium content of 0.004% by weight is measured at the end of percolation, corresponding to an exchange yield of 99.0%.

This demonstrates that the exchange process according to the invention is just as efficient for anionic starches as for cationic starches.

EXAMPLE IX

Tests of application of new starches exchanged with phosphate according to the invention to the manufacture of paper In this example two series of tests for the preparation of paper pulp were carried out, using conventional cationic starches, that is to say starches containing chlorides associated with cationic nitrogen substituents, and starches exchanged with phosphate according to the invention.

A first series of tests was carried out in a neutral medium and the second in an acid medium.

Six different samples of cationic starch were tested:

sample 1: cationic starch HI-CAT 142 marketed by the Applicant Company (see example V) containing 1.32% by dry weight of chloride (in the associated form and in the free form);

sample 2: cationic starch HI-CAT 142 containing 0.89% by dry weight of chloride (in the associated form);

sample 3: cationic starch HI-CAT 142 exchanged according to the invention with monosodium phosphate (counter-anion $H_2PO_4^-$) containing 0.206% by weight dry weight of residual associated chlorides (exchange yield=77%);

sample 4: similar to sample 3 but containing only 0.100% by dry weight of residual associated chlorides (exchange yield=89%);

samples 5 and 6: cationic starch HI-CAT 142 exchanged according to the invention by disodium phosphate (counter-anion=$HPO_4^{--}$) containing less than 0.001% by dry weight of residual associated chlorides (exchange yield=99.9%).

A 50/50 mixture of a long fibre soda pulp and a short fibre soda pulp to which have been added a filler based on grade B kaolin and glue prepared by boiling cationic starch is used as starting material in each series of tests.

After refining and mixing of the different constituents by means of conventional apparatus, a web of paper pulp is produced which serves as a basis for the manufacture of the sheet of paper.

Each series of tests comprises twelve tests, six of which were carried out by a method known as short circuit, in which the glue of cationic starch is incorporated at the end of the mixing line while the six other tests were carried out by a method known as long circuit, in which an additional synthetic additive is used, for example PERCOL 292, which is introduced at the end of the mixing line whereas the glue of cationic starch is incorporated at the head of the line.

It should also be noted that in the second series of tests, which take place in an acid medium, aluminium sulphate is added to the pulp and the pH is maintained at 4.5 by means of sulphuric acid.

The influence of the various samples of starch on the web of paper pulp and hence ultimately on the paper obtained is ascertained by determining, on the one hand, the web retention, which is an indication of the loss of filler and of fine fibres, and, on the other hand, the filler retention of the web.

The results of the two series of tests are shown below.

| 1) Tests in a neutral medium a) Short circuit The cationic starch is in this case dosed in a quantity of 0.3% by dry weight. | | | | | | |
|---|---|---|---|---|---|---|
| Samples of cationic starch | 1 | 2 | 3 | 4 | 5 | 6 |
| Web retention (in %) | 82.6 | 85.4 | 84.9 | 83.9 | 83.7 | 83.9 |
| Filler retention (in %) | 72.6 | 73.9 | 72.9 | 73 | 74.1 | 74.1. |

It is found that the cationic starches which have been exchanged with phosphates (tests 3 to 6) provide a slight improvement in the characteristics of retention compared with comparison sample 1 which is a traditional cationic starch containing chlorides.

| b) long circuit The cationic starch amounts to 1.5% by dry weight of the pulp | | | | | | |
|---|---|---|---|---|---|---|
| Samples of cationic starch | 1 | 2 | 3 | 4 | 5 | 6 |
| Web retention (in %) | 82.1 | 81.8 | 82.1 | 82.2 | 82.1 | 81.5 |
| Filler retention (in %) | 61.9 | 60.9 | 60.5 | 62.5 | 63.1 | 63.7 |

The cationic starches which have been exchanged with phosphates (tests 3 to 6) do not modify the characteristics of web retention compared with cationic starches containing chloride counter-ions.

On the other hand, the cationic starches exchanged with disodium phosphate increase the filler retention compared with the control sample.

| 2) Tests in an acid medium a) short circuit (containing 0.3% by dry weight of cationic starch) | | | | | | |
|---|---|---|---|---|---|---|
| Samples of cationic starch | 1 | 2 | 3 | 4 | 5 | 6 |
| Web retention in %) | 82.3 | 84 | 84.3 | 83.9 | 83.8 | 84.3 |
| Filler retention (in %) | 73.4 | 77 | 75.9 | 74.2 | 74.6 | 74.8 |

It appears that the cationic starches according to the invention (tests 3 to 6) have the advantageous effect of increasing web retention and filler retention compared with the control containing chlorides (1).

| b) long circuit (cationic starch content 1.5% by dry weight) | | | | | | |
|---|---|---|---|---|---|---|
| Samples of cationic starch | 1 | 2 | 3 | 4 | 5 | 6 |
| Web retention (in %) | 77.5 | 77.3 | 77 | 77.7 | 78.3 | 78 |
| Filler retention (in %) | 70.1 | 69.5 | 70 | 70 | 69.3 | 64.7 |

The phosphate exchanged cationic starches produce characteristics of web retention and charge retention at least as good as those obtained with a conventional starch containing chloride counter-ions.

The results obtained in this example of application show that the cationic starches in which the associated chloride anions have been replaced by phosphates according to the invention have properties which are equivalent to or even better than those of cationic starches with chloride counter-anions hitherto employed.

Further, one of the essential advantages of these new starches is their non-corrosive character. The equipments used in the paper industry are therefore not affected by the counter-ions, in this case the phosphates.

The cationic starches obtained by the process according to the invention may advantageously be used in the paper industry.

We claim:

1. Process for the ionic exchange of ionized starch comprising:

selecting a naturally or chemically ionized cereal or tuber granular starch containing ionic substituents associated with counter-ions selected from the group consisting of organic and inorganic cations and anions, the anions being selected from the group consisting of halide, nitrate, nitrite, sulphate, sulphite, thiosulphate, acetate, adipate, citrate, gluconate, p-tosylate, formate, pripionate, phosphate, borate, thiocyanate, sulphonate ions and the cations being selected from the group consisting of sodium, potassium, magnesium, calcium, barium, manganese, iron, nickel, lead ions, preparing a solution comprising one or more exchange ions different from said counter-ions of said ionized granular starch and capable of replacing said counter-ions of said ionized granular starch, these exchange ions being selected from the group consisting of organic and inorganic cations and anions, the anions being selected from the group consisting of halide, nitrate, nitrite, sulphate, sulphite, thiosulphate, acetate, adipate, citrate, gluconate, p-tosylate, formate, propionate, phosphate, borate, thiocyanate, sulphonate ions and the cations being selected from the group consisting of sodium, potassium, magnesium, calcium, barium, manganese, iron, nickel, lead ions, washing said granular ionized cereal or tuber starch with said solution, thus replacing said counter-ions of said starch with exchange ions present in said solution, recovering the resulting exchanged ionized starch and solution containing the counter-ions initially combined to the starch.

2. Process according to claim 1, wherein the solution is an aqueous solution.

3. Process according to claim 2, wherein non-aqueous solvents are added to the aqueous solution.

4. Process according to claim 3, wherein the non-aqueous solvents are selected from the group consisting of alcohols and ketones.

5. Process according to claim 1, wherein the substitution of counter-ions of the ionized starch is greater than or equal to 70%.

6. Process according to claim 1, wherein the molar stoichiometric ratio of exchange of ions/counter-ions is greater than or equal to 1:1.

7. Process according to claim 6, wherein the molar stoichiometric ratio of exchange ions/counter-ions is from 1:1 to 1.3:1.

8. Process according to claim 1, wherein the washing is carried out by hydrocyloning.

9. Process according to claim 1, wherein the washing is carried out by centrifugation.

10. Process according to claim 1, wherein the washing is carried out by spraying of the solution and filtration under vacuum.

11. Process according to claim 1, wherein the ionized starch is a cationic starch.

12. Process according to claim 1, wherein the counter-ions of cationic starch are halide ions.

13. Process according to claim 12, wherein the halide is chloride.

14. Cationic granular starch having cations attached to starch and phosphate or carboxylate counter-ions associated with said cations.

* * * * *